United States Patent
Zhang et al.

(10) Patent No.: US 8,144,626 B2
(45) Date of Patent: Mar. 27, 2012

(54) DETERMINING DISJOINT PATHS WITH AN OPTIMIZED NUMBER OF REGENERATORS

(75) Inventors: Qiong Zhang, Plano, TX (US); Xi Wang, Murphy, TX (US); Paparao Palacharla, Richardson, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 257 days.

(21) Appl. No.: 12/494,397

(22) Filed: Jun. 30, 2009

(65) Prior Publication Data

US 2010/0329120 A1 Dec. 30, 2010

(51) Int. Cl.
*H04L 12/28* (2006.01)
(52) U.S. Cl. ........... 370/255; 370/351; 709/241; 398/57
(58) Field of Classification Search .......... 370/254–258, 370/351, 386; 709/223, 224, 226, 238–244; 398/43, 57
See application file for complete search history.

(56) References Cited

U.S. PATENT DOCUMENTS

| | | | | |
|---|---|---|---|---|
| 6,765,880 B1 * | 7/2004 | Hillard et al. | ................ | 370/255 |
| 6,928,484 B1 * | 8/2005 | Huai et al. | ................ | 709/239 |
| 7,263,100 B2 * | 8/2007 | Hauser et al. | ............... | 709/223 |
| 7,362,709 B1 * | 4/2008 | Hui et al. | ................ | 709/239 |
| 7,362,974 B2 * | 4/2008 | De Patre et al. | ............. | 709/239 |
| 7,420,923 B2 * | 9/2008 | Helgesen | .................... | 709/238 |
| 7,561,534 B2 * | 7/2009 | Alicherry et al. | ............. | 370/255 |
| 7,599,621 B2 * | 10/2009 | Guy et al. | ...................... | 398/57 |
| 2002/0101869 A1 * | 8/2002 | Garcia-Luna-Aceves et al. | ............................. | 370/351 |
| 2003/0193898 A1 * | 10/2003 | Wong et al. | ................... | 370/254 |
| 2003/0227877 A1 * | 12/2003 | Kar et al. | ....................... | 370/254 |
| 2004/0032831 A1 * | 2/2004 | Matthews | .................... | 370/254 |
| 2004/0042473 A1 * | 3/2004 | Park et al. | ..................... | 370/256 |
| 2005/0088965 A1 * | 4/2005 | Atlas et al. | .................... | 370/254 |
| 2005/0237950 A1 * | 10/2005 | Yuan et al. | .................... | 370/255 |
| 2009/0252033 A1 * | 10/2009 | Ramakrishnan et al. | ..... | 370/254 |

OTHER PUBLICATIONS

Ramesh Bhandari, "*Survivable Networks: Algorithms For Diverse Routing*", Kluwer Academic Publishers, pp. 64-66, 1999.
Jian Qiang Hu, "*Diverse Routing in Optical Mesh Networks*", IEEE Transactions on Communications, vol. 51, No. 3, pp. 489-494, Mar. 2003.
Ajay Todimala and Byrav Ramamurthy, "*IMSH: An Iterative Heuristic for SRLG Diverse Routing in WDM Mesh Networks*", IEEE, pp. 199-204, Oct. 2004.
Maher Ali, "*Shareability In Optical Networks: Beyond Bandwidth Optimization*", IEEE Optical Communications, pp. S11-S15, Feb. 2004.

(Continued)

*Primary Examiner* — Jeffrey M Rutkowski
(74) *Attorney, Agent, or Firm* — Baker Botts L.L.P.

(57) ABSTRACT

According to particular embodiments, determining disjoint paths includes receiving a graph representing a network comprising nodes and links. The graph is transformed such that the number of intermediate nodes of a path indicates the number of regenerators for the path. A set of seed paths from a source node to a destination node of the transformed graph is generated. For each seed path, a shortest path from the source node to the destination node is determined to yield one or more pairs of disjoint paths from the source node to the destination node. An optimized pair of disjoint paths is selected, where the optimized pair of disjoint paths has an optimized number of regenerators.

21 Claims, 8 Drawing Sheets

OTHER PUBLICATIONS

Xi Yang, "*Survivable Lightpath Provisioning in WDM Mesh Networks Under Shared Path Protection and Signal Quality Constraints*", Journal of Lightwave Technology, vol. 23, No. 4, pp. 1556-1567, Apr. 2005.

Yong Ouyang, Qingji Zeng, Wei Wei, "*Dynamic lightpath provisioning with signal quality guarantees in survivable translucent optical networks*", Optics Express, vol. 13, No. 26, pp. 10457-10468, Dec. 26, 2005.

"*FLASHWAVE® 9500—The Definitive Packet Optical Networking Platform*", Fujitsu Network Communications, Inc., www.us.fujitsu.com/telecom, Copyright 2007 Fujitsu Network Communications, Inc., 10 pages, 2007.

Jane Simmons, "*Optical Network Design and Planning*", Chapter 3: Routing Algorithms, Springer, 1st Edition, pp. 77-78, Jun. 2, 2008.

\* cited by examiner

DETERMINING DISJOINT PATHS WITH AN OPTIMIZED NUMBER OF REGENERATORS

TECHNICAL FIELD

This invention relates generally to the field of communication networks and more specifically to determining disjoint paths with an optimized number of regenerators.

BACKGROUND

In a communication network (such as an optical network), signals (such as optical signals) are transmitted along paths of the network. Some signal loss may occur during transmission. Optical regenerators along the paths may be used to boost degraded signals. It may be more cost-effective to use fewer regenerators on the paths.

SUMMARY OF THE DISCLOSURE

In accordance with the present invention, disadvantages and problems associated with previous techniques for determining disjoint paths may be reduced or eliminated.

According to particular embodiments, determining disjoint paths includes receiving a graph representing a network comprising nodes and links. The graph is transformed such that the number of intermediate nodes of a path indicates the number of regenerators for the path. A set of seed paths from a source node to a destination node of the transformed graph is generated. For each seed path, a shortest path from the source node to the destination node is determined to yield one or more pairs of disjoint paths from the source node to the destination node. An optimized pair of disjoint paths is selected, where the optimized pair of disjoint paths has an optimized number of regenerators.

Certain embodiments of the invention may provide one or more technical advantages. A technical advantage of one embodiment may be that disjoint paths between a source and a destination may be determined. The disjoint paths may be used as a working path and a protection path between the source and the destination. Another technical advantage of one embodiment may be that the path may have an optimized (such as the smallest) number of regenerators, which may be zero, one, two or more regenerators. Another technical advantage of one embodiment may be that fast links may be used to more quickly identify disjoint paths.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
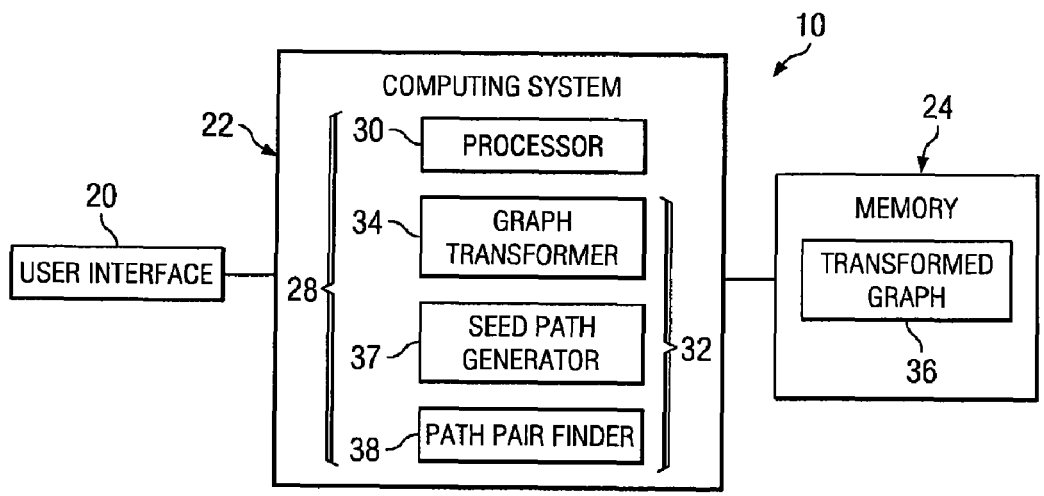
FIG. 1 illustrates an example of a system that may be used to determine disjoint paths with an optimized number of regenerators.

FIG. 1 illustrates one embodiment of a system 10 that may be used to determine disjoint paths with an optimized number of regenerators. In certain embodiments, system 10 may determine the disjoint paths by transforming a graph representing a network of nodes and links. The transformed graph may turn the problem of finding the optimized (such as smallest) number of regenerators into finding the optimized (such as smallest) number of hops. System 10 may then determine disjoint paths of the transformed graph with the optimized number of hops.

In certain embodiments, system 10 determines disjoint paths of a communication network. A communication network allows nodes to communicate with other nodes. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

A communication network comprises nodes and links. A node may be a network element that facilitates communication of signals as the signals travel along paths. Examples of network elements include routers, switches, wavelength division multiplexers (WDMs), access gateways, endpoints, softswitch servers, trunk gateways, a network management system, or other device configured to route packets through, to, or from a network. In particular embodiments, a signal travels along a path from a source node through zero, one, or more intermediate nodes to a destination node.

A link transports a signal from one node to the next node, and may comprise any fiber operable to transport a signal, such as an optical fiber. Optical physical impairments (for example, polarization mode dispersion, amplified spontaneous emission, and Q-factor) may affect how a signal travels through a link.

A regenerator regenerates signals to avoid or reduce signal degradation that affects communication. In particular embodiments, an optical regenerator regenerates optical signals. A regenerator has a maximum reach, which indicates the maximum distance a regenerated signal can travel without unsatisfactory degradation. A transmitter at a source node generates signals with a maximum reach. A receiver at a destination node typically cannot receive signals with unsatisfactory degradation.

In particular embodiments, a graph may be used to represent a network that comprises nodes and links. Accordingly, a graph includes representations of nodes and links. As a shorthand in this document, a graph may be described as including nodes and links, instead of representations of nodes and links.

In the illustrated embodiment, system 10 includes a user interface 20, a computing system 22, and a memory 24. Computing system 22 includes logic 28 such as processor 30 and applications 32. Applications 32 include a graph transformer 34, a seed path generator 37, and a path pair finder 38. Memory stores a transformed graph 36.

In particular embodiments, graph transformer 34 transforms a graph to yield transformed graph 36. The graph may be transformed by adding virtual links that connect to nodes that are optically reachable without a regenerator. The transformation changes a least-regenerator routing problem to a least-hop routing problem. Accordingly, a least-regenerator route may be found by determining the least-hop route of transformed graph 36. Thus, a pair of disjoint paths with the least number of regenerators may be found by determining the pair of disjoint path with the least number of hops on transformed graph 36.

In particular embodiments, seed path generator 37 generates a set of one or more seed paths from a source node to a destination node. Seed path generator 37 may determine the seed paths in any suitable manner, such as according to a k-shortest path algorithm. The k-shortest path algorithm refers to any suitable algorithm that determines a number k of the shortest path among nodes. The k-shortest paths may include the shortest path and other paths that are short but not the shortest.

Any suitable number of seed paths may be determined, for example, k may be a value between 1 and 30. Number k may be larger to find an optimal solution or k may be smaller to more quickly find a solution. In particular embodiments, system 10 may require a number k smaller than known methods require to find an optimal solution.

In particular embodiments, path pair finder 38 determines disjoint paths with an optimized number of regenerators. Path pair finder 38 may determine the pair of disjoint path with the smallest number of hops on transformed graph 36 to find disjoint paths with the smallest number of regenerators.

In particular embodiments, path pair finder 38 may perform the following for one or more iterations to yield one or more pairs of disjoint paths between a source node and a destination node of transformed graph 36: select a seed path between the source node and the destination node; assign link costs to links of transformed graph 36; calculate a shortest path from the source node to the destination node; and remove an overlap between the selected seed path and the shortest path to obtain a pair of disjoint paths. Path pair finder 38 may then select a pair of disjoint paths with the smallest number of regenerators.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/ or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 2:
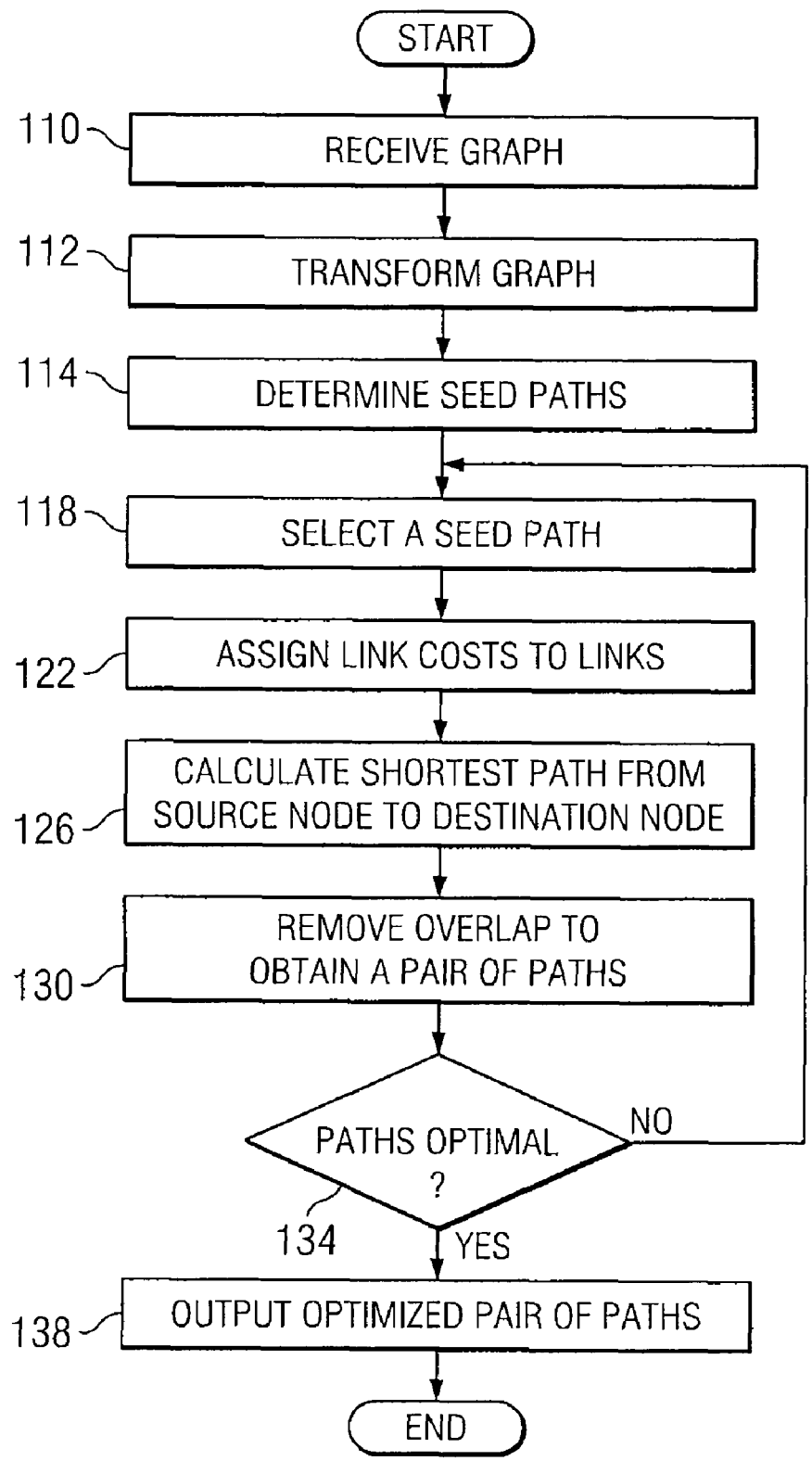
FIG. 2 illustrates an example of a method for determining disjoint paths that may be performed by the system of FIG. 1.

FIGS. 2 through 4C illustrate an example of a method for determining disjoint paths with an optimized number of regenerators that may be performed by system 10 of FIG. 1. FIG. 2 illustrates a flowchart of the method. The method starts at step 110, where a graph is received. The graph represents a network comprising nodes and links.

The graph is transformed at step 112 to yield transformed graph 36. The transformation changes a least-regenerator routing problem to a least-hop routing problem, so a pair of disjoint paths with the least number of regenerators may be found by determining the pair of disjoint path with the least number of hops on transformed graph 36. An example of graph transformation is described in more detail with reference to FIGS. 3A and 3B.

Figure 3A:
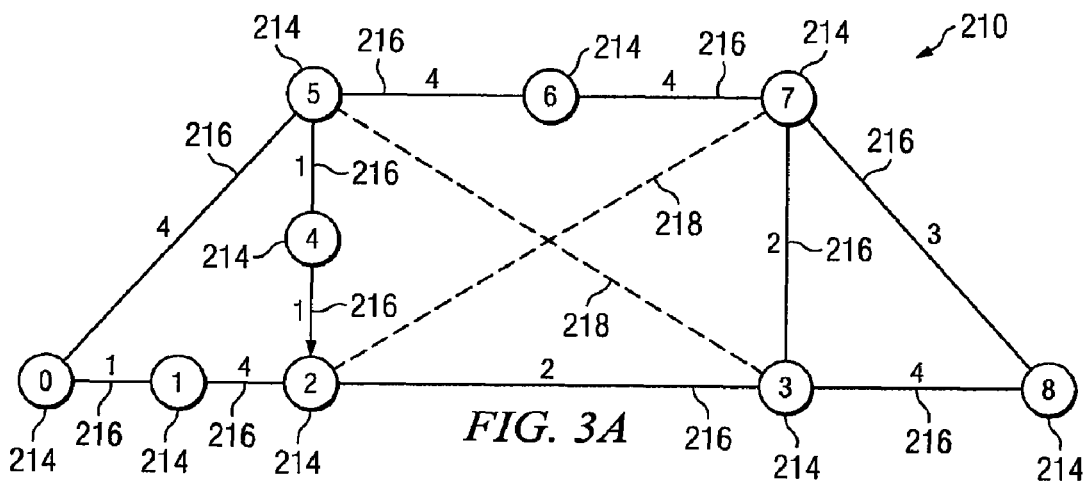
FIGS. 3A and 3B illustrate an example graph that may be transformed according to the method of FIG. 2.
Figure 3B:
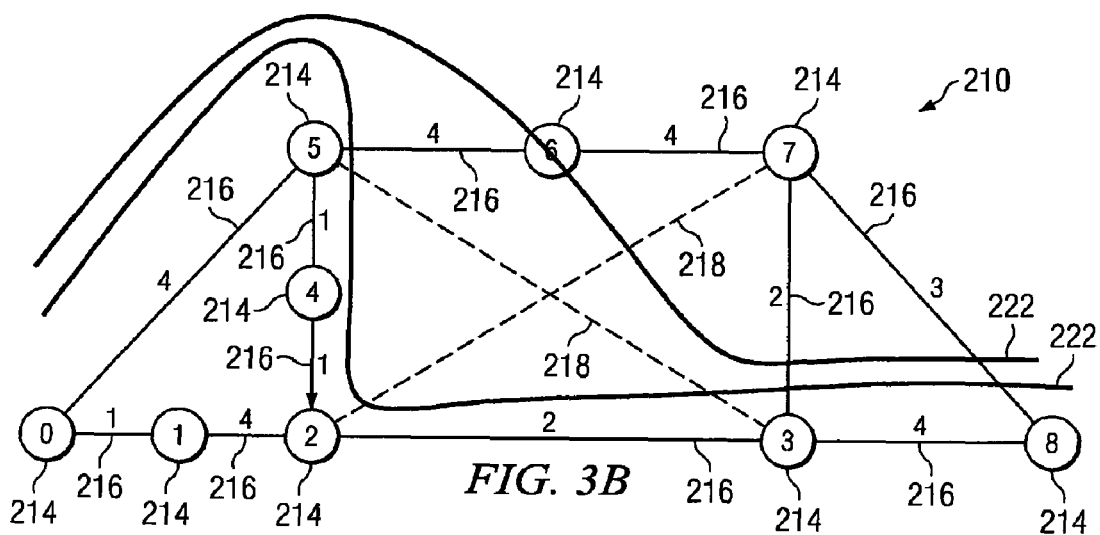

FIGS. 3A and 3B illustrate an example graph 210 that includes nodes 214 and links 216. Nodes 214 include nodes 0 through 8, and each link 216 has an associated distance indicated on graph 210. A regenerator may be potentially located at a node 214, and the maximum reach of each regenerator is 4. Virtual links 218 are added to graph 210 to transform graph 210 into transformed graph 36. A virtual link 218 connects two nodes 214 that are optically reachable without a regenerator. Optical reachability may be described in terms of the distance of a link. The distance of a link may be a metric that may be calculated according to the optical physical impairments, the number of nodes, and/or the length of the link.

In particular embodiments, nodes 214 may be optically reachable without a regenerator if the distance $D(x,y)$ between nodes x and y satisfies (for example, is equal to or less than) the maximum reach of the regenerator at the node x sending the signal. The distance $D(x,y)$ between nodes x and y may be the sum of the distance between intermediate nodes between nodes x and y.

In the example:

$$D(3,5)=D(3,2)+D(2,4)+D(4,5)=2+1+1=4$$

Nodes 3 and 5 are reachable, so virtual link 218 is added between nodes 3 and 5. Similarly, nodes 2 and 7 are reachable, so virtual link 218 is added between nodes 2 and 7. A pair of disjoint path with the least number of hops on the transformed graph may yield a pair of disjoint paths with the least number of regenerators.

Figure 4A:
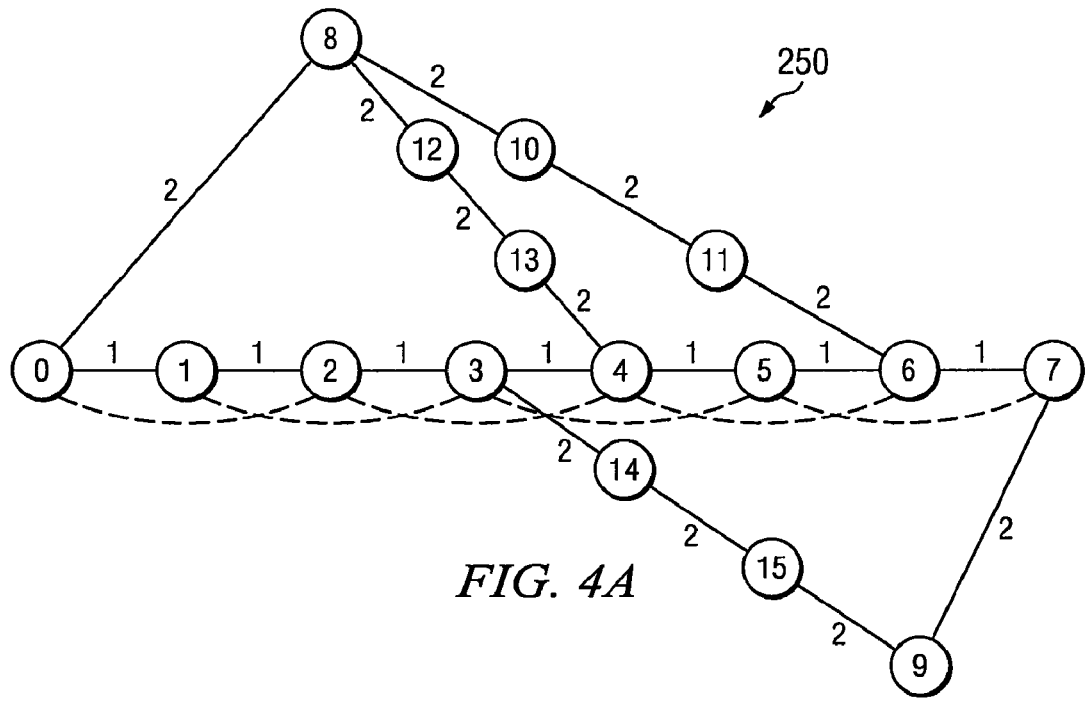
FIGS. 4A through 4C illustrate a transformed graph for which disjoint paths may be determined according to the method of FIG. 2.
Figure 4B:
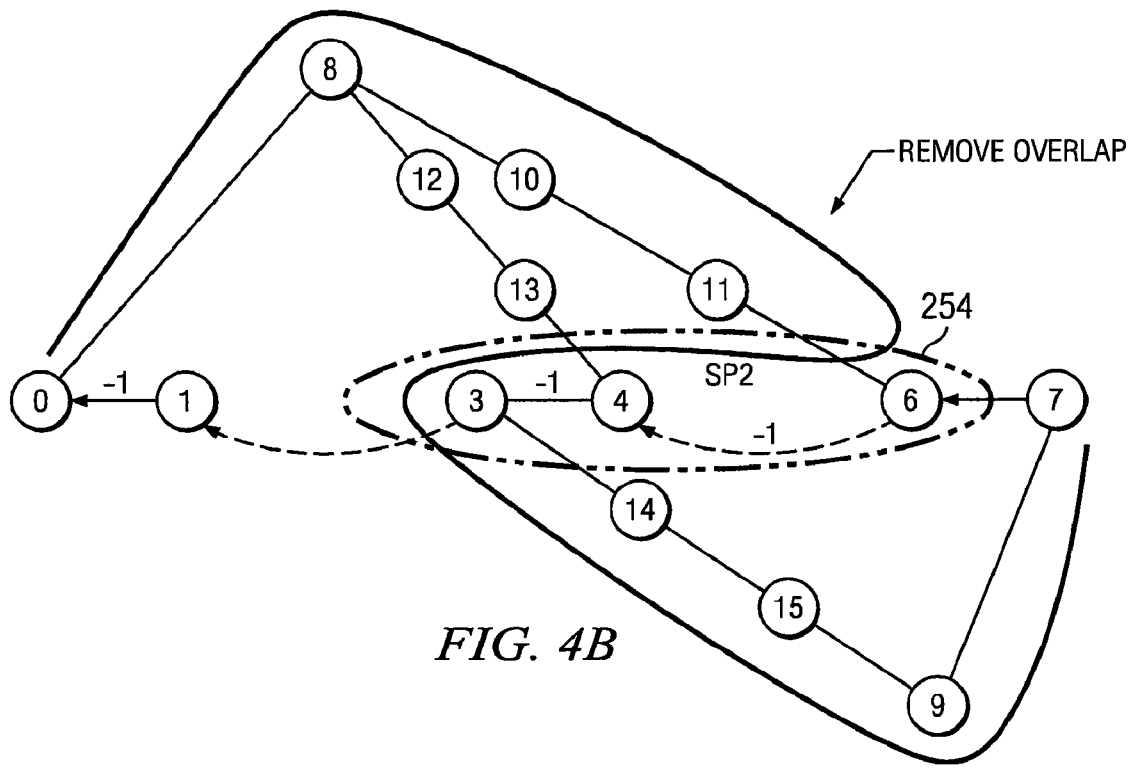
Figure 4C:
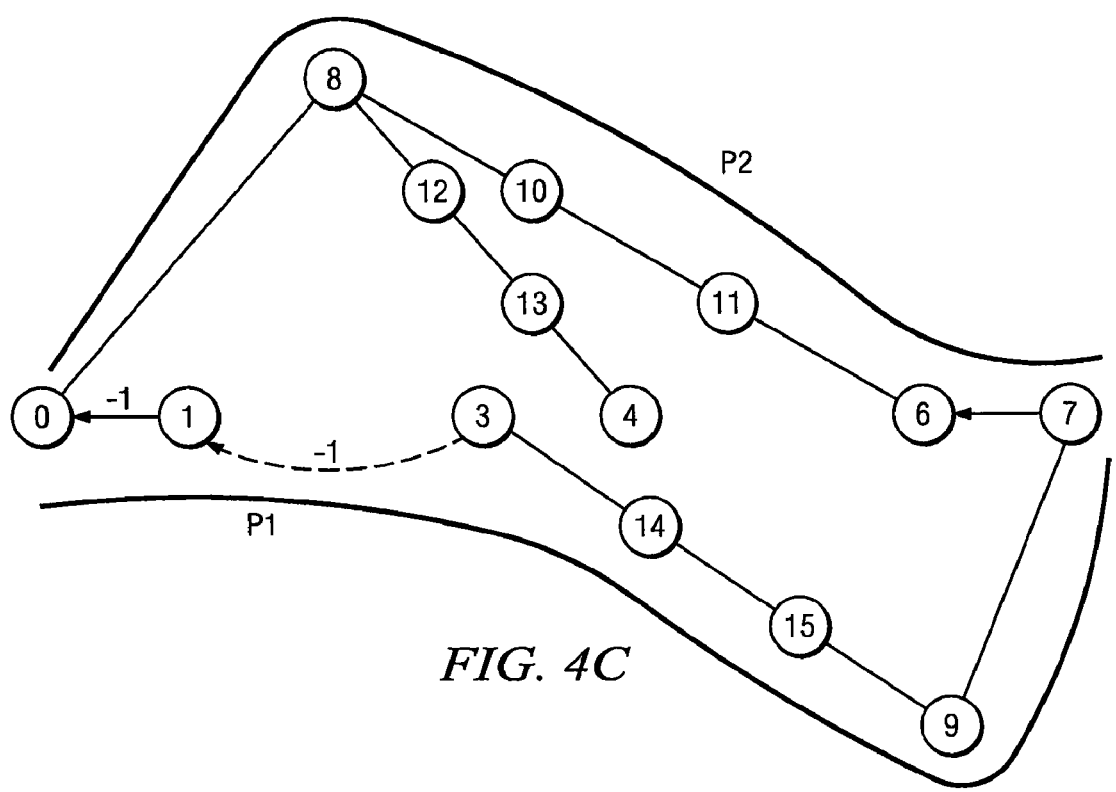

Referring back to FIG. 2, one or more seed paths from a source node to a destination node of transformed graph 36 are generated at step 114. FIGS. 4A through 4C illustrate an example seed path. In the example of FIG. 4A, graph 250 has nodes 0 through 15, with a source node 0 and a destination node 7. Seed paths including seed path SP1 [0, 1, 3, 4, 6, 7] are generated. Each intermediate node along a seed path has a regenerator, and the maximum reach of each regenerator is 2.

Referring back to FIG. 2, steps 118 and 134 are performed for one or more iterations to yield one or more pairs of disjoint paths. A seed path is selected at step 118. In example, seed path SP1 [0, 1, 3, 4, 6, 7] is selected. Link costs are assigned to at least a subset of the links at step 122. The costs may be assigned such that costs directed towards the destination node are greater than costs directed towards the source node. For example, links directed towards the destination node may be assigned the greatest cost, and links directed towards the source node may be assigned the least cost.

Greatest and least costs may be expressed in any suitable manner. The greatest cost may be expressed as a very high value, such as infinity. A least cost may be expressed as a very low value. For example, if a cost of x (for example, x=1) is initially assigned to the links, then a least cost may be −x (for example, −x=−1). The method may be set to avoid negative cycles.

FIG. 4B illustrates the example cost assignments. The links with the greatest costs have been removed since they have infinite costs.

Referring back to FIG. 2, transformed graph 210 may be modified in order to ensure that the resulting pair of paths is disjoint. In certain embodiments, portions of the path that share a common risk with seed path may be removed. For example, one or more links and/or one or more nodes that share a common risk with the seed path may be removed.

A shortest path from the source node to the destination node is calculated at step 126. The shortest path may be the path with the fewest number of nodes, and may be calculated in any suitable manner, for example, using a breadth-first search shortest path routing technique. If the costs directed towards the source node are negative, the calculation of the shortest path may avoid negative cycles.

FIG. 4B illustrates an example shortest path SP2. An overlap between the selected seed path and the shortest path is removed at step 130 to obtain a pair of paths. FIG. 4B illustrates an example overlap 254 between seed path SP1 and shortest path SP2. FIG. 4C illustrates example disjoint paths P1 and P2 formed after removal of overlap 254. Each intermediate node along P1 and P2 may need a regenerator.

Referring back to FIG. 2, the pair of paths may be optimal paths at step 134. Optimal paths may be the paths with the smallest number of regenerators, and may be determined according to the following:
if $$\# REG(Pi) \geq \frac{\# REG(Pa+Pb)}{2},$$

then (Pa, Pb) is the optimal pair where #REG(P) represents the number of regenerators of path P, Pi represents the seed path for the ith iteration, and (Pa, Pb) represents the current optimal disjoint pair. If the paths are optimal, the method proceeds to step 138. If the paths are not optimal, the method returns to step 118 to select a next seed path.

An optimized pair of paths is output at step 138. An optimized pair of paths may be the paths that are designated as optimal during the last iteration of step 134. The method then ends.

FIGS. 5A through 5E illustrate an example of transformed graph 250 for which disjoint paths may be determined. The following seed paths from node 0 to node 7 may be generated for transformed graph 250 of FIG. 5A:

SP 1 [0, 1, 3, 5, 7]
SP 2 [0, 2, 3, 5, 7]
SP 3 [0, 2, 4, 5, 7]
SP 4 [0, 2, 4, 6, 7]
SP 5 [0, 1, 2, 3, 5, 7]
SP 6 [0, 1, 2, 4, 5, 7]
SP 7 [0, 1, 2, 4, 6, 7]
SP 8 [0, 1, 3, 4, 5, 7]
SP 9 [0, 1, 3, 4, 6, 7]
SP 10 [0, 1, 3, 5, 6, 7]
SP 11 [0, 2, 3, 4, 5, 7]
SP 12 [0, 2, 3, 4, 6, 7]
SP 13 [0, 2, 3, 5, 6, 7]
SP 14 [0, 2, 4, 5, 6, 7]
SP 15 [0, 8, 10, 11, 6, 7]
SP 16 [0, 1, 2, 3, 4, 5, 7]

Figure 5A:
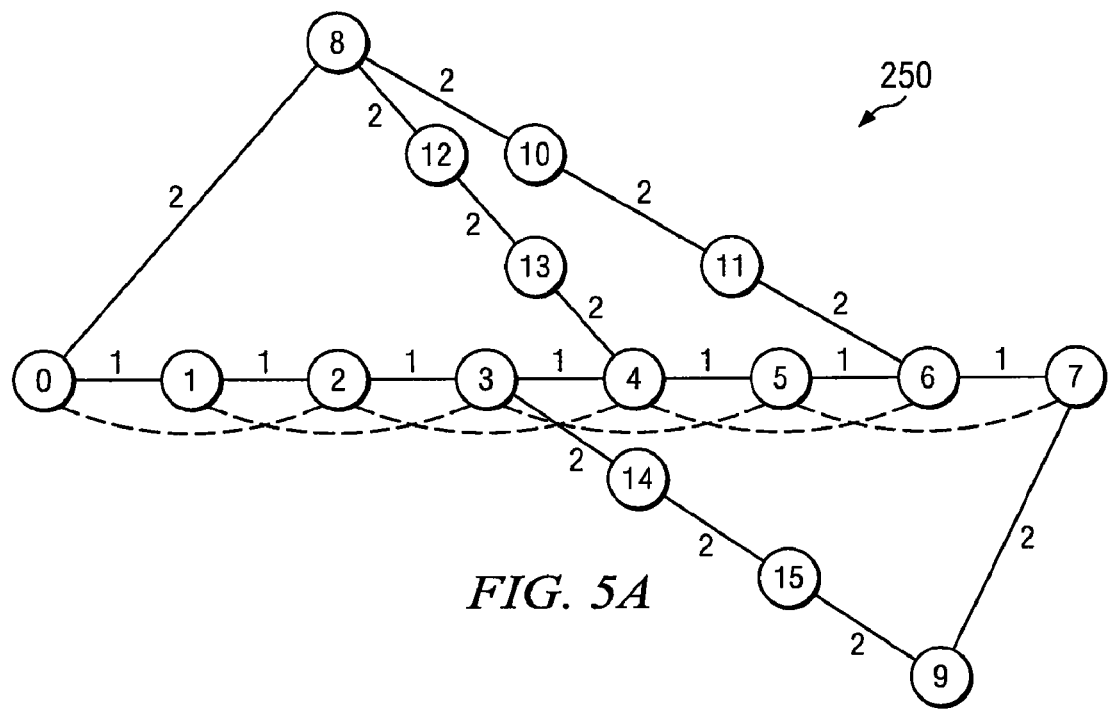
FIGS. 5A through 5E illustrate an example of transformed graph for which disjoint paths may be determined.
Figure 5B:
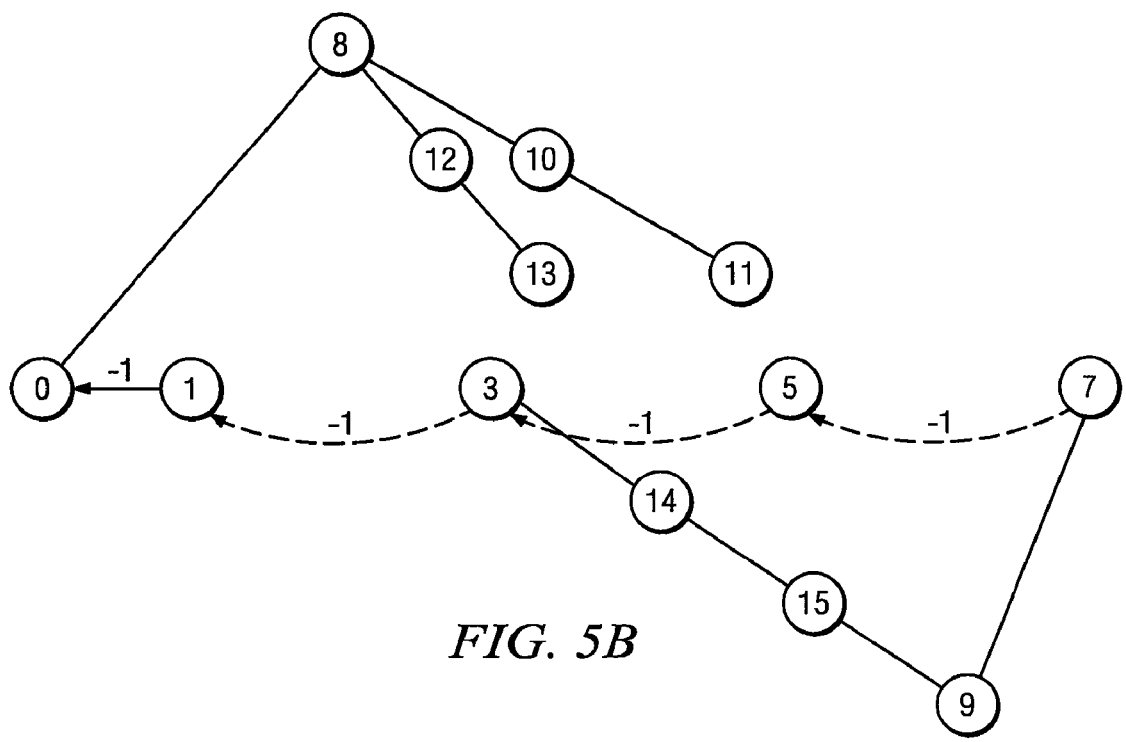
Figure 5C:
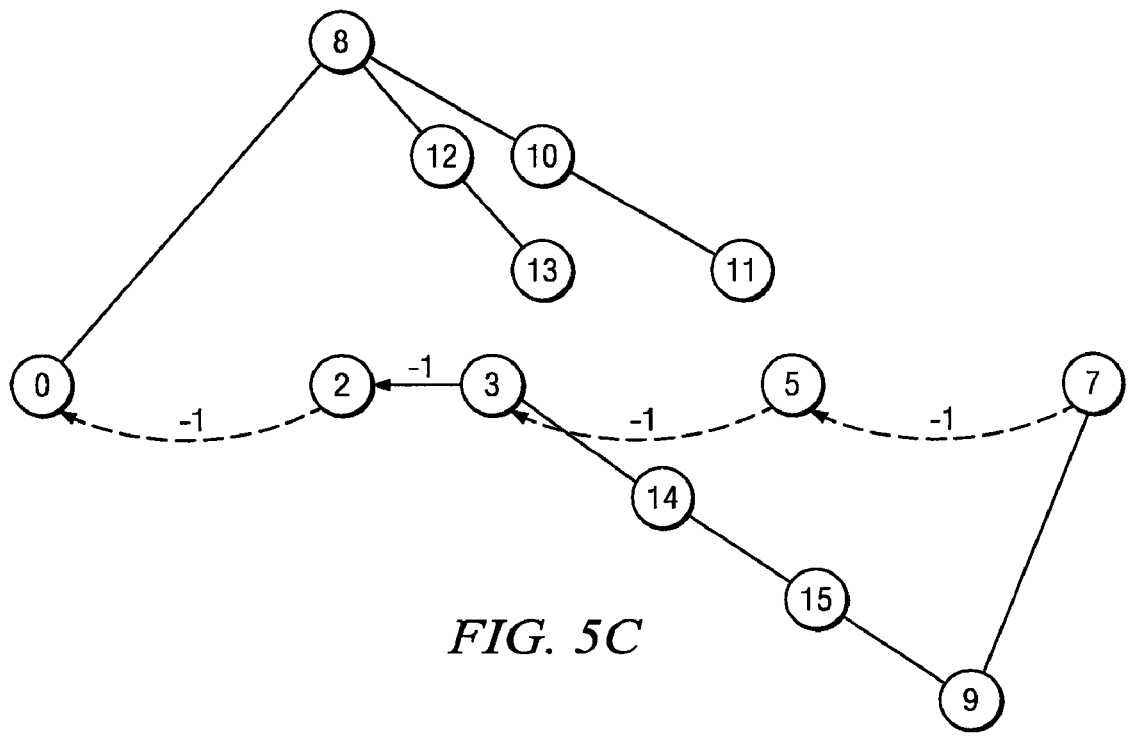
Figure 5D:
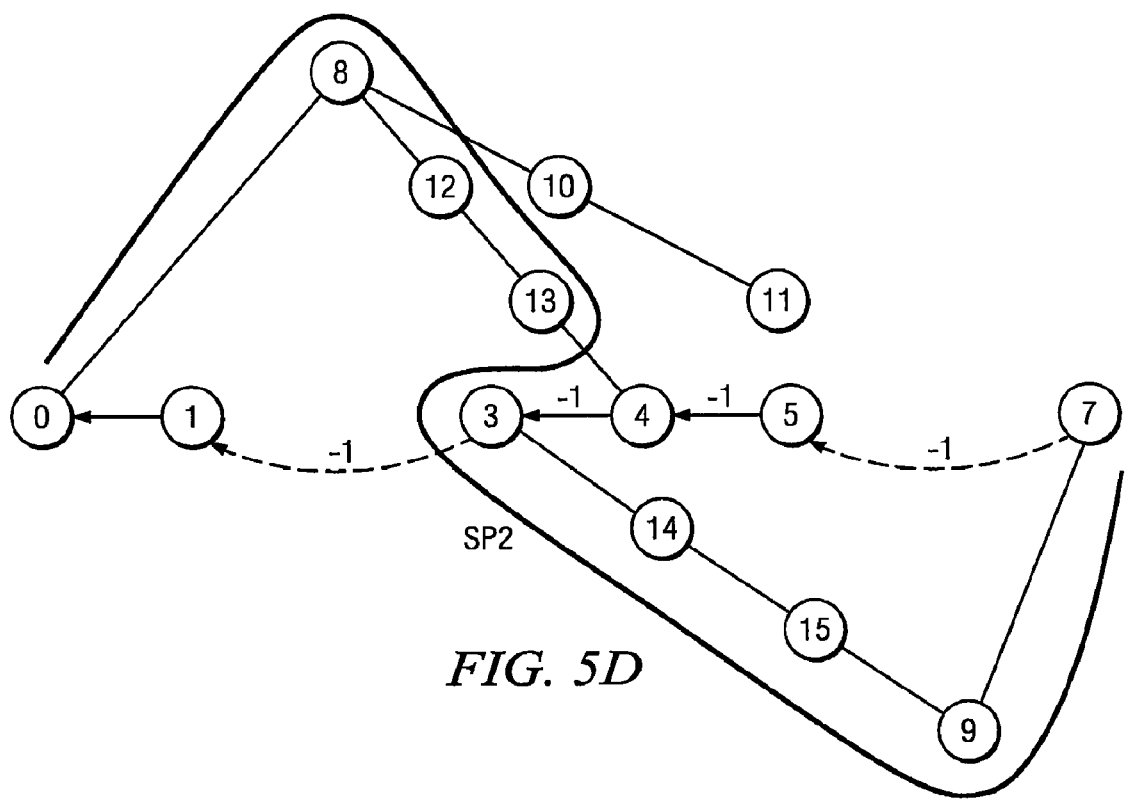
Figure 5E:
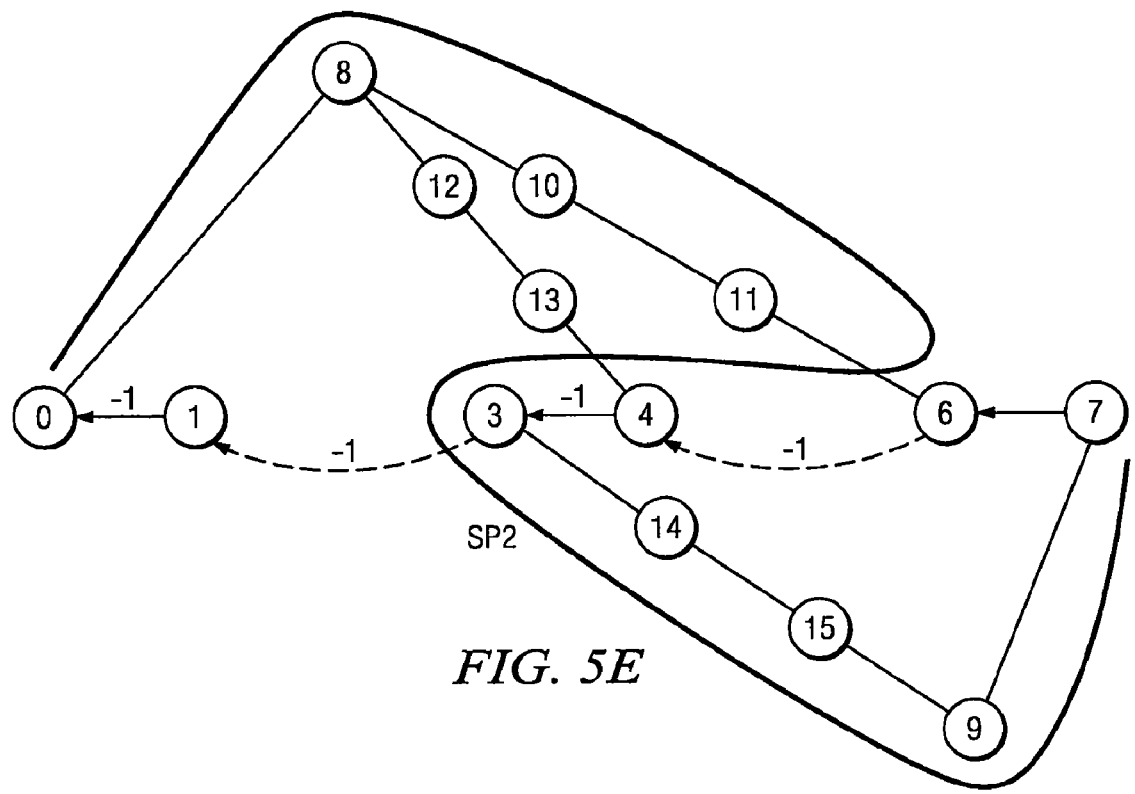

FIG. 5B illustrates a seed path SP1 for which disjoint paths cannot be found. FIG. 5C illustrates a seed path SP2 for which disjoint paths cannot be found. FIG. 5D illustrates a seed path SP8 for which disjoint paths are found. The disjoint paths include ten regenerators. FIG. 5E illustrates a seed path SP9 for which disjoint paths are found. The disjoint paths include nine regenerators.

Figure 6:
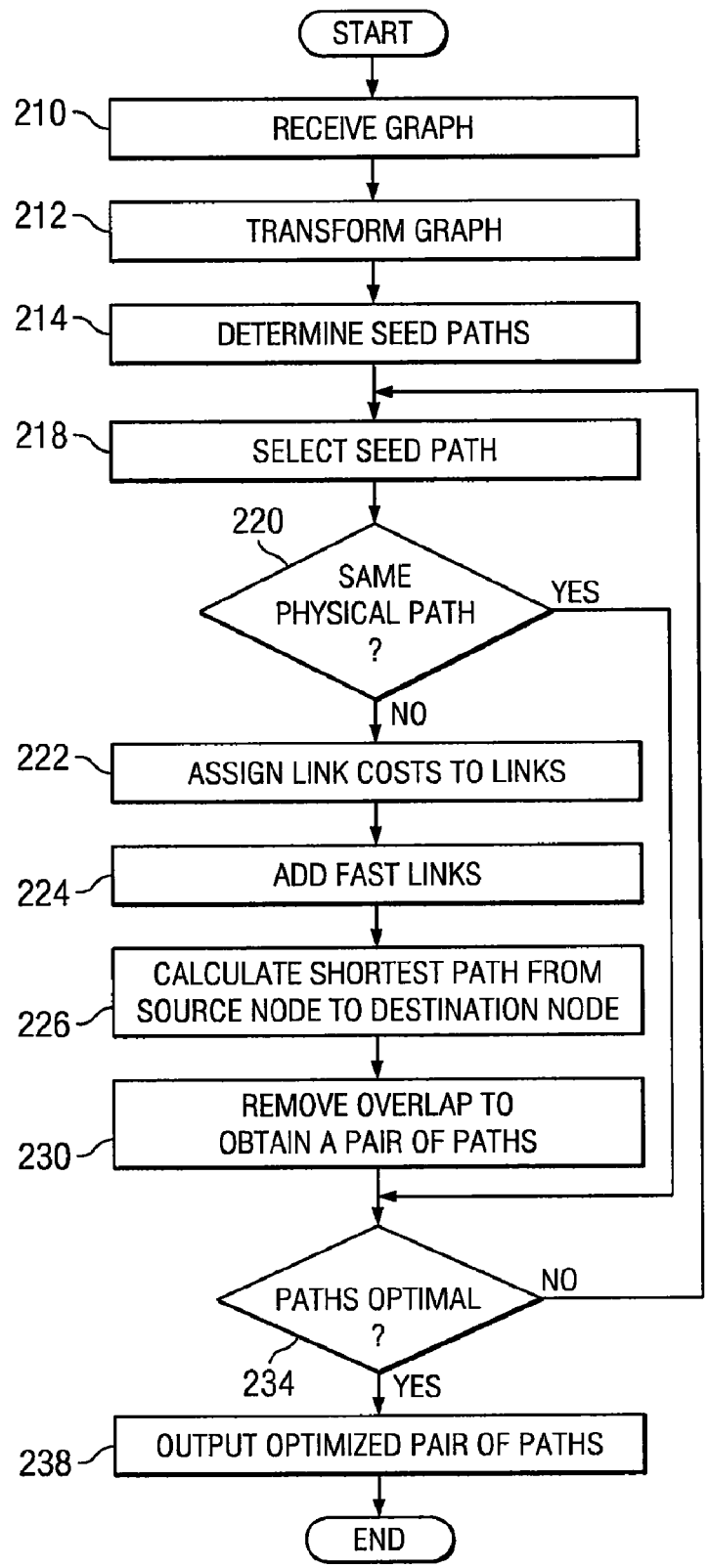
FIG. 6 illustrates another example of a method for determining disjoint paths that may be performed by the system of FIG. 1.
Figure 7A:
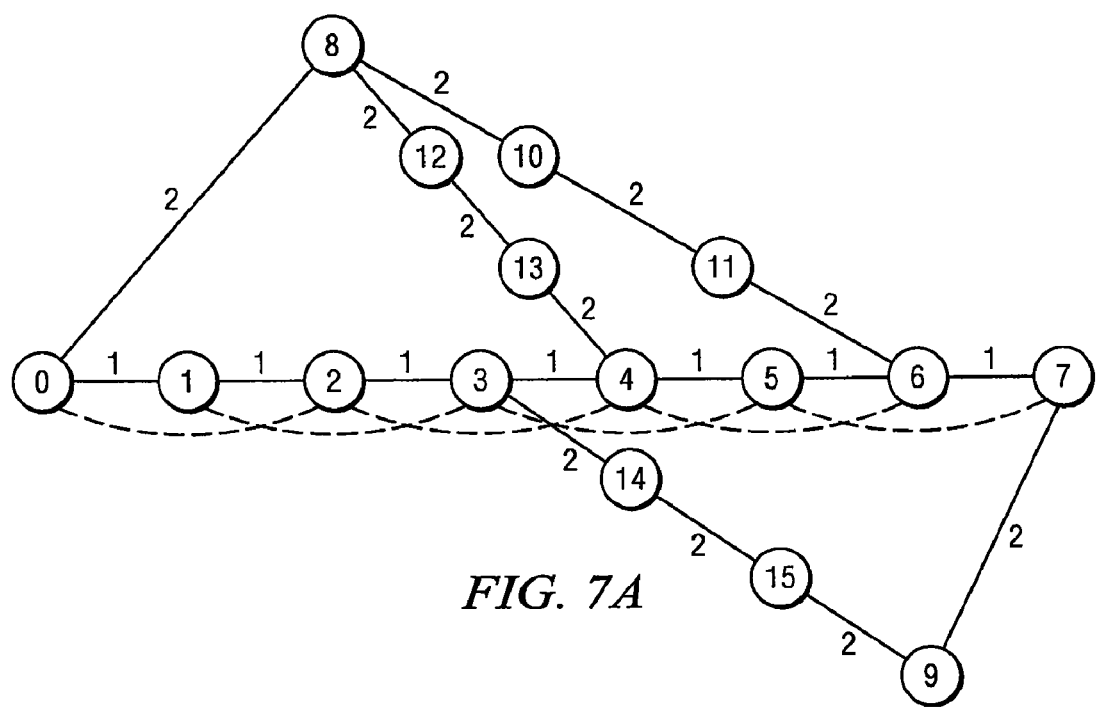
FIGS. 7A and 7B illustrate a transformed graph for which disjoint paths may be determined according to the method of FIG. 6.
Figure 7B:
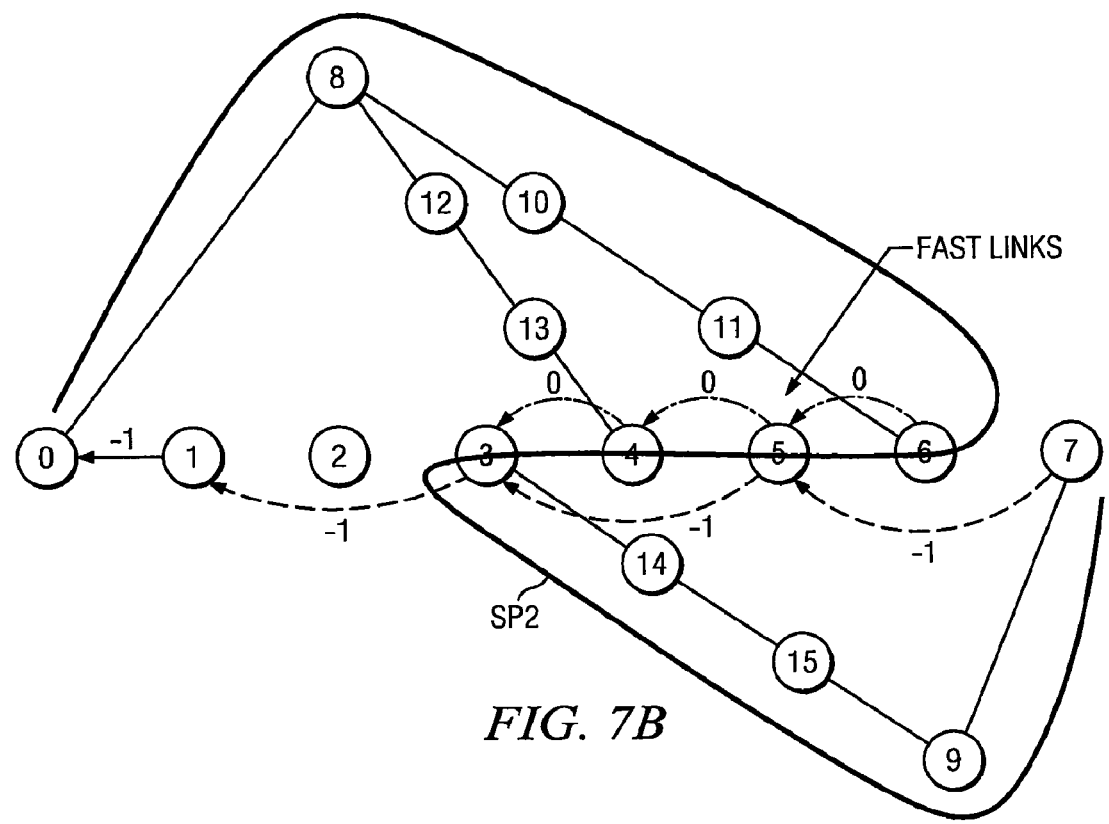

FIGS. 6 through 7B illustrate another example of a method for determining disjoint paths with an optimized number of regenerators. The method adds fast links to consolidate seed paths that represent the same physical path to one seed path. In the example of FIG. 7A, the following seed paths have the same physical path [0, 1, 2, 3, 4, 5, 6, 7]:

SP1 [0, 1, 3, 5, 7]
SP2 [0, 2, 3, 5, 7]
SP3 [0, 2, 4, 5, 7]
SP4 [0, 2, 4, 6, 7]
SP5 [0, 1, 2, 3, 5, 7]
SP6 [0, 1, 2, 4, 5, 7]
SP7 [0, 1, 2, 4, 6, 7]
SP8 [0, 1, 3, 4, 5, 7]
SP9 [0, 1, 3, 4, 6, 7]
SP10 [0, 1, 3, 5, 6, 7]
SP11 [0, 2, 3, 4, 5, 7]
SP12 [0, 2, 3, 4, 6, 7]
SP13 [0, 2, 3, 5, 6, 7]
SP14 [0, 2, 4, 5, 6, 7]
SP16 [0, 1, 2, 3, 4, 5, 7]

Steps 210 through 218 may be substantially similar to steps 110 through 118 of FIG. 2. The method starts at step 210, where a graph is received. The graph is transformed at step 212 to yield transformed graph 36. One or more seed paths from a source node to a destination node of transformed graph 36 are generated at step 214. A seed path is select at step 218.

The selected seed path may represent the same physical path as a previously analyzed seed path. If so, the method proceeds to step 234. If not, the method proceeds to step 222.

Link costs are assigned to the links at step 222. In particular embodiments, links directed towards the destination node may be assigned the greatest cost, and links directed towards the source node may be assigned the least cost. FIG. 7B illustrates the example cost assignments. The links with the greatest costs have been removed since they have infinite costs. In certain embodiments, portions of the path that share a common risk with seed path may be removed. For example, one or more links (and/or one or more nodes) that share a common risk with the seed path may be removed.

Fast links are added at step 224. A fast link is a virtual link among nodes of a seed path that indicates a possible overlap between the seed path and the shortest path. A fast link is directed towards the source node. In certain examples, the number of fast links used may be reduced by only adding fast links among regenerator nodes and nodes with a physical nodal degree greater than or equal to 3. The cost of a fast link indicates the additional number of regenerators needed on both the seed path and the shortest path if an overlap occurs on the fast link.

Steps 226 through 238 may be substantially similar to steps 126 through 138 of FIG. 2. A shortest path from the source node to the destination node is calculated at step 226. An overlap between the selected seed path and the shortest path is removed at step 230 to obtain a pair of paths. The pair of paths may be optimal paths at step 234. If so, the method proceeds to step 238. If not, the method returns to step 218 to select a next seed path. An optimized pair of paths is output at step 238. An optimized pair of paths may be the paths that are designated as optimal after during the last iteration of step 234. The method then ends.

Modifications, additions, or omissions may be made to the systems disclosed herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. As used in this document, "each" refers to each member of a set or each member of a subset of a set. A subset of a set may include zero, one or more, or all elements of the set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving a graph representing a network comprising a plurality of nodes and a plurality of links;
   transforming the graph such that the number of intermediate nodes of a path indicates the number of regenerators for the path;
   generating a set of one or more seed paths from a source node to a destination node of the transformed graph;
   for each seed path of a subset of the seed paths, determining using a processor a shortest path from the source node to the destination node to yield a pair of disjoint paths from the source node to the destination node, the determining the shortest path comprising:
      adding one or more fast links, a fast link indicating a possible overlap segment between the each seed path and the shortest path; and
      assigning a fast link cost to each fast link, the cost of a fast link indicating an additional number of regenerators on both the shortest path and the each seed path if an overlap occurs; and
   selecting an optimized pair of disjoint paths from the pairs of disjoint paths, the optimized pair of disjoint paths having an optimized number of regenerators.

2. The method of claim 1, the generating the set of one or more seed paths further comprising:
   determining the seed paths according to a k-shortest path algorithm.

3. The method of claim 1, the determining the shortest path further comprising performing the following for one or more iterations:
   selecting a seed path from the subset of the seed paths;
   assigning a link cost to each link of at least a subset of the links of the transformed graph;
   calculating a shortest path from the source node to the destination node according to the link costs; and
   removing an overlap between the selected seed path and the shortest path to obtain a pair of disjoint paths.

4. The method of claim 1, the determining the shortest path further comprising:
   assigning a greatest cost to one or more links directed towards the destination node.

5. The method of claim 1, the determining the shortest path further comprising:
   assigning a least cost to one or more links directed towards the source node.

6. The method of claim 1, the determining the shortest path further comprising:
   removing one or more links of that share a common risk with the each seed path.

7. The method of claim 1, the determining the shortest path further comprising:
   removing one or more nodes that share a common risk with the each seed path.

8. The method of claim 1, the selecting the optimized pair of disjoint paths further comprising:
   selecting the pair of disjoint paths with the smallest number of regenerators.

9. The method of claim 1, further comprising:
   consolidating at least two seed paths that represent the same physical path to one seed path.

10. An apparatus comprising:
    one or more non-transitory computer readable media configured to store a graph representing a network comprising a plurality of nodes and a plurality of links; and
    one or more processors configured to:
       transform the graph such that the number of nodes of the path indicates the number of intermediate regenerators for the path;
       generate a set of one or more seed paths from a source node to a destination node of the transformed graph;
       for each seed path of a subset of the seed paths, determine a shortest path from the source node to the destination node to yield a pair of disjoint paths from the source node to the destination node, the determining the shortest path comprising:
          adding one or more fast links, a fast link indicating a possible overlap segment between the each seed path and the shortest path; and
          assigning a fast link cost to each fast link, the cost of a fast link indicating an additional number of regenerators on both the shortest path and the each seed path if an overlap occurs; and
       select an optimized pair of disjoint paths from the pairs of disjoint paths, the optimized pair of disjoint paths having an optimized number of regenerators.

11. The apparatus of claim 10, the one or more processors configured to generate the set of one or more seed paths by:
    determining the seed paths according to a k-shortest path algorithm.

12. The apparatus of claim 10, the one or more processors configured to determine the shortest path by performing the following for one or more iterations:
   selecting a seed path from the subset of the seed paths;
   assigning a link cost to each link of at least a subset of the links of the transformed graph;
   calculating a shortest path from the source node to the destination node according to the link costs; and
   removing an overlap between the selected seed path and the shortest path to obtain a pair of disjoint paths.

13. The apparatus of claim 10, the one or more processors configured to determine the shortest path by:
   assigning a greatest cost to one or more links directed towards the destination node.

14. The apparatus of claim 10, the one or more processors configured to determine the shortest path by:
   assigning a least cost to one or more links directed towards the source node.

15. The apparatus of claim 10, the one or more processors configured to determine the shortest path by:
   removing one or more links that share a common risk with the each seed path.

16. The apparatus of claim 10, the one or more processors configured to determine the shortest path by:
   removing one or more nodes that share a common risk with the each seed path.

17. The apparatus of claim 10, the one or more processors configured to select the optimized pair of disjoint paths by:
   selecting the pair of disjoint paths with the smallest number of regenerators.

18. The apparatus of claim 10, the one or more processors configured to:
   consolidate at least two seed paths that represent the same physical path to one seed path.

19. A method comprising:
   receiving a graph representing a network comprising a plurality of nodes and a plurality of links;
   transforming the graph such that the number of intermediate nodes of a path indicates the number of regenerators for the path;
   generating a set of one or more seed paths from a source node to a destination node of the transformed graph;
   for each seed path of a subset of the seed paths, determining using a processor a shortest path from the source node to the destination node to yield a pair of disjoint paths from the source node to the destination node by performing the following for one or more iterations:
   selecting a seed path from the subset of the seed paths;
   assigning a link cost to each link of at least a subset of the links of the transformed graph by:
      assigning a greatest cost to one or more links directed towards the destination node; and
      assigning a least cost to one or more links directed towards the source node;
   adding one or more fast links, a fast link indicating a possible overlap segment between the each seed path and the shortest path; and
   assigning a fast link cost to each fast link, the cost of a fast link indicating an additional number of regenerators on both the shortest path and the each seed path if an overlap occurs
   calculating a shortest path from the source node to the destination node according to the link costs; and
   removing an overlap between the selected seed path and the shortest path to obtain a pair of disjoint paths; and
   selecting an optimized pair of disjoint paths from the pairs of disjoint paths, the optimized pair of disjoint paths having an optimized number of regenerators.

20. The method of claim 19, the determining the shortest path further comprising:
   removing one or more links that share a common risk with the each seed path; and
   removing one or more nodes that share a common risk with the each seed path.

21. The method of claim 19, further comprising:
   consolidating at least two seed paths that represent the same physical path to one seed path.

\* \* \* \* \*